US 6,819,757 B1

(12) United States Patent
Cook et al.

(10) Patent No.: US 6,819,757 B1
(45) Date of Patent: Nov. 16, 2004

(54) INFORMATION TRANSFER TO A CALL AGENT USING A PORTAL SYSTEM

(75) Inventors: Fred S. Cook, Olathe, KS (US); Warren B. Cope, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 229 days.

(21) Appl. No.: 10/244,579

(22) Filed: Sep. 16, 2002

(51) Int. Cl.[7] .................. H04M 3/00; H04M 5/00; G06F 15/16
(52) U.S. Cl. ............... 379/265.09; 379/265.04; 709/227
(58) Field of Search .................. 379/265.02, 265.03, 379/265.04, 265.09, 266.01, 309; 370/352; 709/200, 201, 228, 242, 227

(56) References Cited

U.S. PATENT DOCUMENTS

| | | | |
|---|---|---|---|
| 6,459,788 B1 | 10/2002 | Khuc et al. | |
| 6,473,505 B1 | 10/2002 | Khuc et al. | |
| 6,570,963 B1 * | 5/2003 | Watson et al. | 379/52 |
| 6,690,664 B1 * | 2/2004 | Khuc et al. | 370/352 |
| 2002/0165784 A1 * | 11/2002 | Taggart et al. | 705/26 |
| 2003/0033356 A1 * | 2/2003 | Tran et al. | 709/203 |

OTHER PUBLICATIONS

"Remote Call Center Tools" http://www.gilgordon.com/resources/products6.htm dated May 10, 2002.
"Distributed Call Center Builds Better Relationships at Case Corporation" http://www.teloquent.com/company/success_stories/manufacturing/case.asp dated May 10, 2002.
"Distributed Call Centers: New Technology, New Approach" http://www.tmcnet.com/articles/ctimag/0298/ccenter001.htm dated May 10, 2002.
"The home of DialVision—Web-based CIM (Customer Interaction Management) Software" http://www.dialvision.com/ dated May 10, 2002.
"Alpine Access Agents Receive Real Time Client News" http://www.alpineaccess.com/alpine/news/pr12.jsp dated May 10, 2002.
"Alpine Access: Our Vision" http://www.alpineaccess.com/alpine/vision.jsp dated May 10, 2002.

* cited by examiner

*Primary Examiner*—Benny Tieu

(57) ABSTRACT

A call center system is described that is comprised of an information control system and a portal system. The information control system receives a call agent identifier. The information control system formats and transfers a message that includes the call agent identifier. The portal system receives the message and caller information for the caller. The portal system transmits the caller information to a call agent system over the Internet based on the call agent identifier.

34 Claims, 4 Drawing Sheets

INFORMATION TRANSFER TO A CALL AGENT USING A PORTAL SYSTEM

BACKGROUND OF THE INVENTION

1. Field of the Invention

The invention is related to the field of communication systems, and in particular, to using a portal system to transmit caller information over the Internet to a call agent.

2. Statement of the Problem

Many large businesses and organizations use call centers to handle the high volume of calls that they receive. Call centers are traditionally housed in large facilities that have multiple work stations for call agents. The work stations have a phone and a computer to allow the agents to handle a call. When a call comes in to the call center, call center logic selects an agent to handle the call. The agent either looks up information about the caller using the computer or the information is automatically pushed to the agent's computer. Examples of caller information are a name and address of the caller, an account number of caller, preferences of the caller, and any previous transactions of the caller. The agent then handles the call using the caller information. Unfortunately, call centers as the one described above are expensive to operate considering the high costs of providing and maintaining the facility. Also, agents must commute to the site of call center which reduces the potential pool of workers available for the call center.

To help alleviate this problem, some companies have created distributed call centers. Distributed call centers allow agents to work from home. A call center office houses call center logic and a list of available agents. From home, an agent calls into the call center office to get on the list of available agents. When a call comes in, the call center logic selects one of the available agents and forwards the call to that agent. The phone at the agent's home rings and the agent handles the call. One problem with distributed call centers such as this is getting information about the caller to an agent to help the agent handle the call.

Distributed call agents also provide on-line assistance. An agent logs in to the call center office to get on the list of available agents. When an e-mail message comes in, the call center logic selects one of the available agents and forwards the e-mail message to that agent. The agents receives the e-mail message over his/her computer and the agent provides a response to the e-mail message. Once again, a problem with a distributed call center such as this is getting information about the sender of the e-mail message to an agent to help the agent respond to the e-mail message.

Many large businesses and organizations also use portals to allow users to access information. A portal is a user interface that defines a community of interest. A portal may provide a customized presentation to each particular user. One example of a portal is a web site at www.charless-chwab.com.

Typical portals operate as follows. A user logs in to the portal. During the login process, the portal obtains the Internet address of the user. When logged on, the user selects information to view. The portal sometimes customizes the information for that particular user. Once the information is selected, the portal pushes the information over the Internet to the Internet address of the user. Unfortunately, portals have not been effectively adapted to work with a telephone system to transfer information to a call agent.

SUMMARY OF THE SOLUTION

The invention helps solve the above problems by using a portal system to transmit caller information to a call agent to help the call agent in handling a call. The invention advantageously provides a more cost effective and secure method of providing distributed call centers. The invention also advantageously allows call centers to reach out to a larger pool of workers. The invention also advantageously uses conventional and well known portal systems to transmit the caller information to the call agent.

One embodiment of the invention is a communication system comprised of a caller, a telephone system, a call center system, the Internet, and a call agent system. The call center system is comprised of an information control system and a portal system. The information control system is configured to receive a call agent identifier. The information control system is further configured to format and transfer a message that includes the call agent identifier. The portal system is configured to receive the message. The portal system is further configured to receive caller information for the caller. The caller information may comprise a name and address of the caller, an account number of caller, preferences of the caller, and any previous transactions of the caller. The portal system is further configured to transmit the caller information to the call agent system over the Internet based on the call agent identifier.

In another embodiment of the invention, an information control system, such as the one described above, is comprised of an interface system and a processing system. The interface system is configured to receive a call agent identifier. The interface system is further configured to transfer the call agent identifier to the processing system. The processing system is configured to receive the call agent identifier and to format a message that includes the call agent identifier. The message is formatted to cause a portal system to initiate a session with the call agent system and to transmit caller information over the Internet to the call agent system based on the call agent identifier. The interface system is further configured to transfer the message to the portal system.

Another embodiment of the invention is a communication system comprised of a sender of an e-mail message, a communication network, a service system, the Internet, and a service agent system. The service agent system is configured to respond to an e-mail message from the sender. The service system is comprised of an information control system and a portal system. The information control system is configured to receive a service agent identifier. The information control system is further configured to format and transfer a control message that includes the service agent identifier. The portal system is configured to receive the control message. The portal system is further configured to receive sender information for the sender. The sender information may comprise a name and address of the sender, an account number of sender, preferences of the sender, and any previous transactions of the sender. The portal system is further configured to transmit the sender information to the service agent system over the Internet based on the service agent identifier.

The invention may include further embodiments that are described below.

DESCRIPTION OF THE DRAWINGS

The same reference number represents the same element on all drawings.

DETAILED DESCRIPTION OF THE INVENTION

FIGS. 1–4 and the following description depict specific examples of a communication system to teach those skilled in the art how to make and use the best mode of the invention. For the purpose of teaching inventive principles, some conventional aspects of the communication system have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
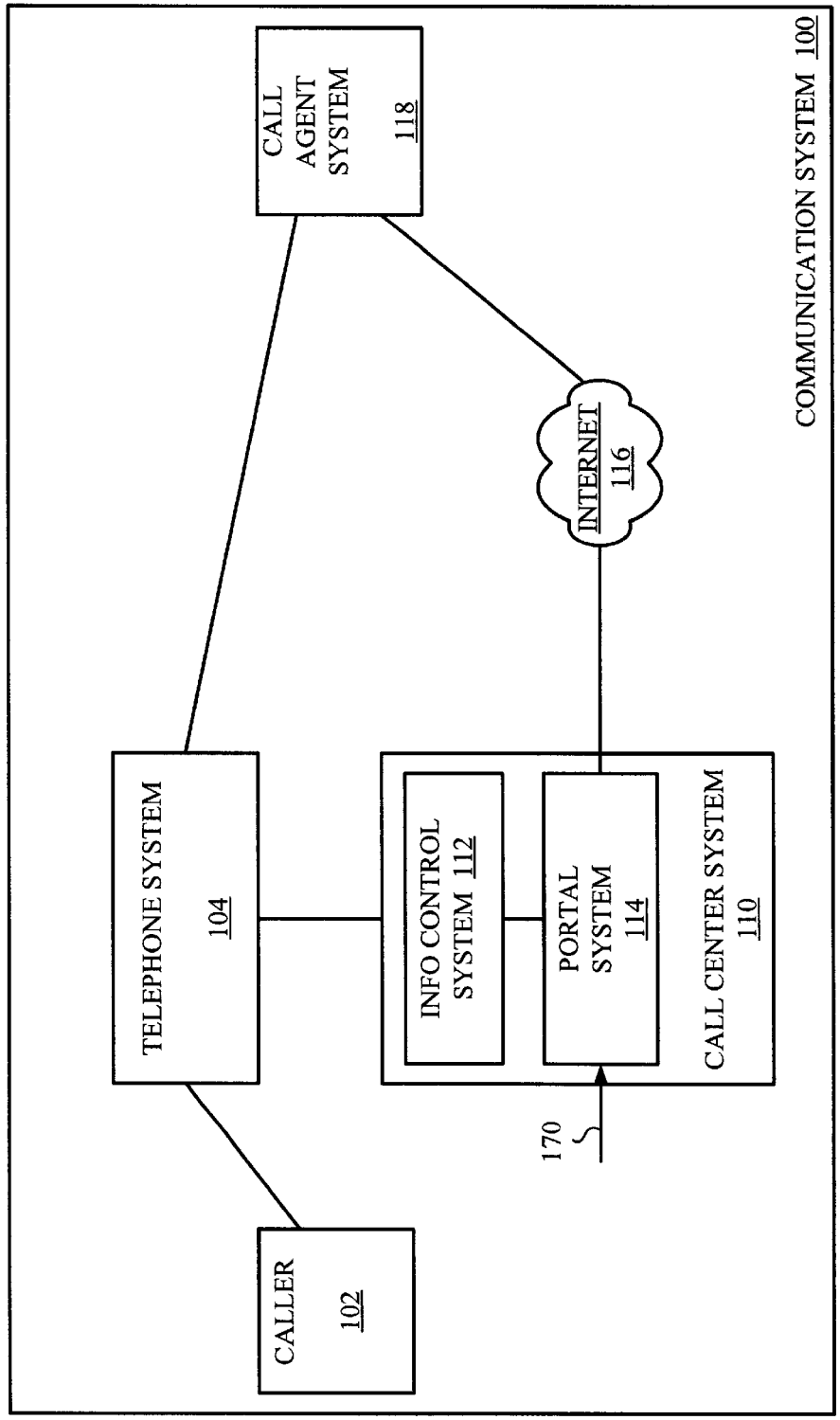
FIG. 1 is a block diagram illustrating a communication system with a call center system in an example of the invention.

Communication System with a Call Center System—FIG. 1

FIG. 1 is a block diagram illustrating a communication system 100 in an example of the invention. Communication system 100 is comprised of a caller 102, a telephone system 104, a call center system 110, the Internet 116, and a call agent system 118. Call center system 110 is comprised of an information control system 112 coupled to a portal system 114. Telephone system 104 is coupled to caller 102, call center system 110, and call agent system 118. Portal system 114 is coupled to the Internet 116. Call agent system 118 is also coupled to the Internet 116.

A telephone system comprises any system and/or network configured to provide telephone service to a caller. The telephone system may include traditional call center logic that selects a call agent to handle a call. A call center system comprises any system that operates as described below. A call agent system comprises any system or device for assisting in handling a call for a third party. The call agent system may include a telephone and/or a computer to assist in handling a call. Caller information comprises any information or data associated with a caller that may help a call agent system in handling a call. Examples of caller information may include a name and address of the caller, an account number of caller, preferences of the caller, and any previous transactions of the caller. A call agent identifier comprises any information or data that indicates a call agent system. One example of a call agent identifier is an Internet address for the call agent system. A caller identifier comprises any information or data that indicates a caller. One example of a caller identifier is a telephone number for the caller.

In operation, caller 102 makes a call to a called party (not shown). The called party may be a large business, large organization, or another party that uses a call center to handle telephone calls. Telephone system 104 receives the call. Telephone system 104 executes call center logic (not shown) to select call agent system 118 to handle the call. The call center logic may be included in systems other than telephone system 104, such as call center system 110. Telephone system 104 then forwards the call to call agent system 118.

Information control system 112 receives a call agent identifier for call agent system 118 that was selected to handle the call. Information control system 112 could receive the call agent identifier from the call center logic in telephone system 104 or from another system. Information control system 112 formats a message that includes the call agent identifier. Information control system 112 transfers the message.

Portal system 114 receives the message. Portal system 114 also receives caller information for caller 102, which is depicted in FIG. 1 by arrow 170. Portal system 114 transmits the caller information to call agent system 118 over the Internet 116 based on the call agent identifier. Based on this disclosure, those skilled in the art will appreciate how to modify existing call center systems to make call center system 110.

Portal system 114 may receive the caller information from multiple sources. For instance, in one embodiment, information control system 112 receives a caller identifier for caller 102 from telephone system 104. Information control system 112 retrieves the caller information based on the caller identifier from a database (not shown). Information control system 112 may include the database or the database may be located in a remote system. Information control system 112 then includes the caller information in the message to portal system 114.

In another embodiment, information control system 112 includes the caller identifier in the message to the portal system 114. Portal system 114 retrieves the caller information based on the caller identifier from a database (not shown).

In either of the above embodiments, the caller identifier may comprise a telephone number of caller 102. Information control system 112 or portal system 114 would then access the database based on the telephone number to determine the caller information.

In another embodiment of the invention, portal system 114 initiates a session with call agent system 118 responsive to the message. To initiate the session, the message from information control system 112 comprises a log on request to log call agent system 118 on to portal system 114. Portal system 114 interprets the call agent identifier in the message so that call agent system 118 becomes the current user. With the session set up, portal system 114 transmits the caller information to call agent system 118 over the Internet 116 based on the call agent identifier. After portal system 114 pushes the caller information to call agent system 118, call agent system 118 may not have further access to call center system 110. For instance, portal system 114 may terminate the session after transmitting the caller information. To terminate the session, portal system 114 may receive a log off request to log call agent system 118 off of portal system 114.

Figure 2:
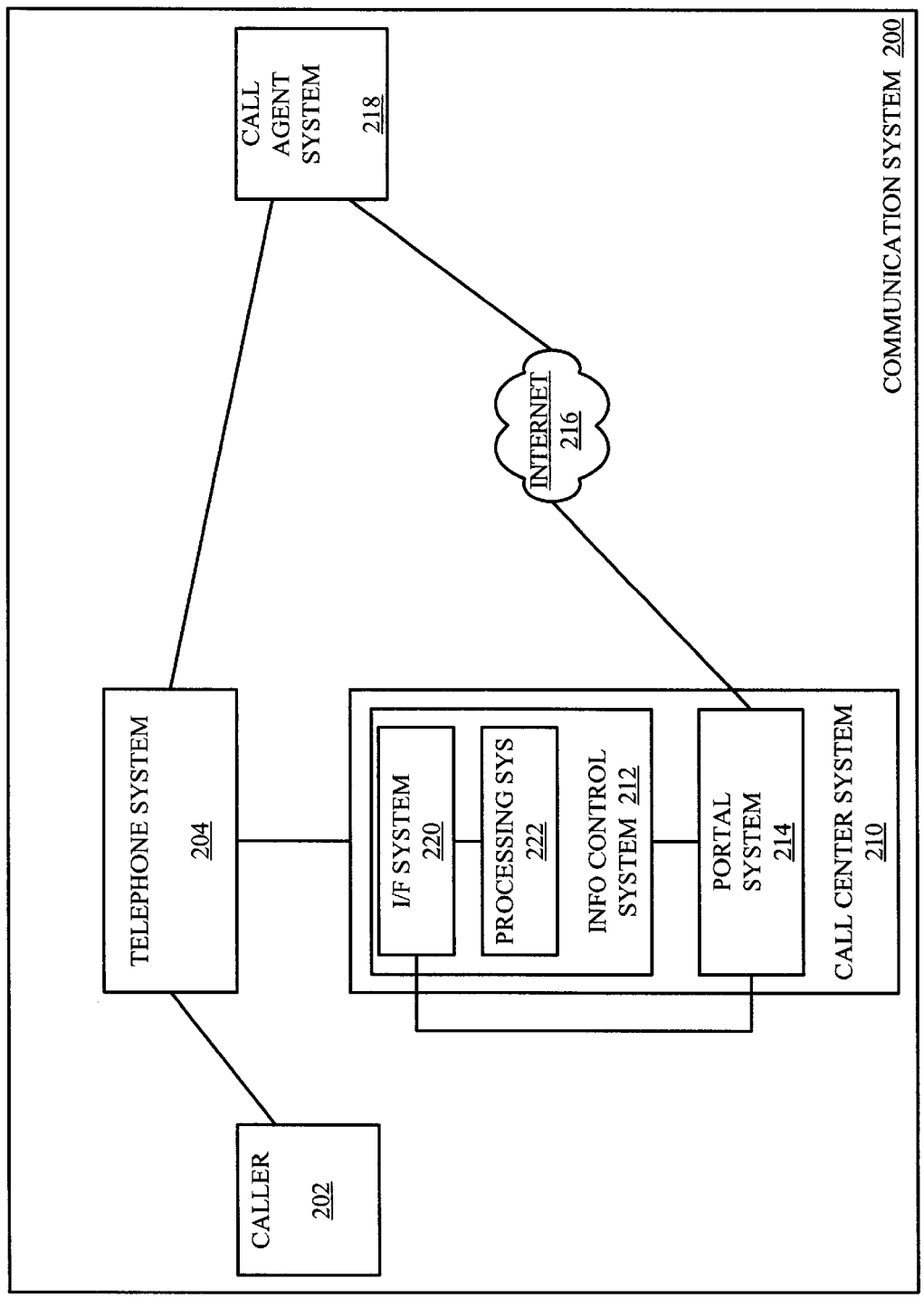
FIG. 2 is a block diagram illustrating a communication system with an information control system in a further example of the invention.

Communication System with an Information Control System—FIG. 2

FIG. 2 is a block diagram illustrating a communication system 200 in an example of the invention. Communication system 200 is comprised of a caller 202, a telephone system 204, a call center system 210, the Internet 216, and a call agent system 218. Call center system 210 is comprised of an information control system 212 coupled to a portal system 214. Information control system 212 may be used for information control system 112 in FIG. 1. Information control system 212 is comprised of an interface system 220 coupled to a processing system 222. Telephone system 204 is coupled to caller 202, call center system 210, and call agent system 218. Portal system 214 is coupled to the Internet 216. Call agent system 218 is also coupled to the Internet 216.

In operation, caller 202 makes a call to a called party (not shown). Telephone system 204 receives the call. Telephone system 204 executes call center logic (not shown) to select call agent system 218 to handle the call. The call center logic may be included in systems other than telephone system 204, such as call center system 210. Telephone system 204 then forwards the call to call agent system 218.

Interface system 220 receives a call agent identifier for call agent system 218 that was selected to handle the call. Interface system 220 could receive the call agent identifier from telephone system 204 or from another system. Interface system 220 transfers the call agent identifier to processing system 222. Processing system 222 formats a message for portal system 214 that includes the call agent identifier. The message is formatted to cause portal system 214 to initiate a session with call agent system 218 and to transmit caller information over the Internet 216 to call agent system 218 based on the call agent identifier. Interface system 220 transfers the message to portal system 214.

Responsive to the message, portal system 214 initiates the session with call agent system 218. Portal system 214 transmits the caller information to call agent system 218 over the Internet 216. Portal system 214 may also terminate the session with call agent system 218 after transmitting the caller information. Based on this disclosure, those skilled in the art will appreciate how to modify existing information control systems to make information control system 212.

Portal system 214 may receive the caller information from multiple sources. For instance, in one embodiment, interface system 220 receives a caller identifier for caller 102 from telephone system 204. Processing system 222 retrieves the caller information based on the caller identifier from a database (not shown). Information control system 212 may include the database or the database may be located in a remote system. Processing system 222 then includes the caller information in the message to portal system 214.

In another embodiment, processing system 222 includes the caller identifier in the message to the portal system 214. Portal system 214 retrieves the caller information based on the caller identifier from a database (not shown).

In either of the above embodiments, the caller identifier may comprise a telephone number of caller 202. Processing system 222 or portal system 214 would then access the database based on the telephone number to determine the caller information.

In another embodiment of the invention, the message comprises a log on request to log on call agent system 218 to portal system 214 and initiate the session with call agent system 218. In another embodiment, processing system 222 generates a log off request for portal system 214 to cause portal system 214 to terminate the session with call agent system 218.

EXAMPLE—FIG. 3

Figure 3:
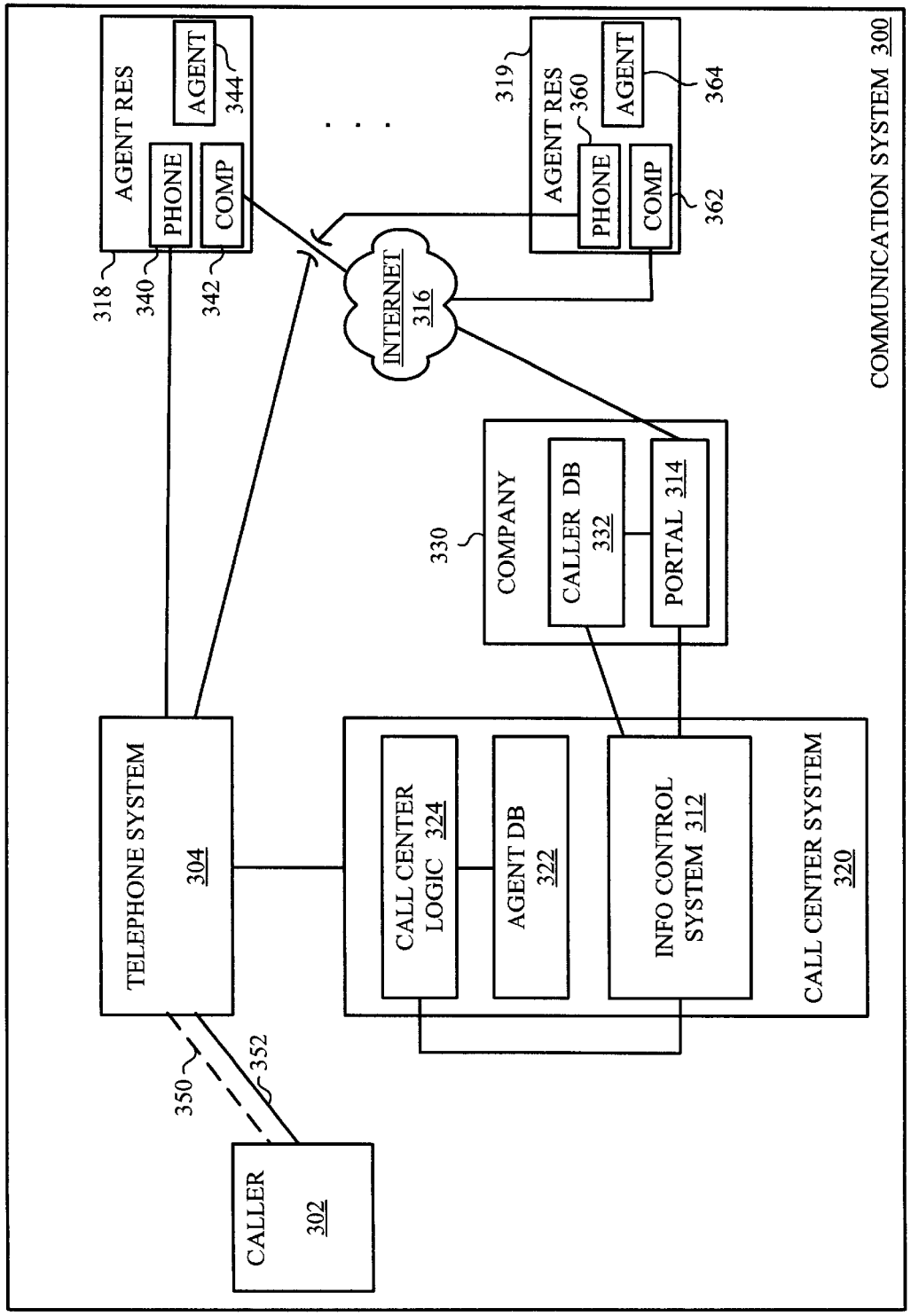
FIG. 3 is a block diagram illustrating a communication system in a further example of the invention.

FIG. 3 is a block diagram illustrating a communication system 300 in an example of the invention. Communication system 300 is comprised of a caller 302, a telephone system 304, a call center system 320, the Internet 316, an agent residences 318, 319, and a Company 330. Call center system 320 is comprised of an information control system 312, an agent database 322, and call center logic 324. Company 330 is comprised of caller database 332 and portal 314. Agent residence 318 is comprised of telephone 340, computer 342, and agent 344. Agent residence 319 is comprised of telephone 360, computer 362, and agent 364.

Caller 302 is coupled to telephone system 304 by a signaling link 350 and a user communications link 352. Telephone system 304 is coupled to telephones 340, 360, and call center system 320. Call center logic 324 is coupled to agent database 322 and information control system 312. Information control system 312 is coupled to caller database 332 and portal 314. Portal 413 is coupled to computers 342, 362 via the Internet 316.

Assume for this example that caller 302 wants to make a call to Company 330. Company 330 receives a large volume of calls, so Company 330 hires call center system 320 to handle the calls. Call center system 320 is a service offered by a telephone company or another company. Agents 344, 364 are able to work from home using telephones 340, 360 and computers 342, 362, respectively. To begin working, agents 344, 364 call into call center system 320 to report their availability. Call center system 320 maintains agent database 322. Agent database 322 keeps track of the agents working for the call center system 320, the agents 344, 364 available at any given time, an Internet address and telephone number for each agent, and other information.

In operation, caller 302 places the call for Company 330 through telephone system 304. The call is comprised of signaling and user communications transmitted over signaling link 350 and user communications link 352, respectively. Signaling and user communications are known to those skilled in the art. Telephone system 304 processes the signaling to determine that call center system 320 is to handle the call. Telephone system 304 transmits the telephone number of caller 302 to call center system 320. The telephone number may be in the form of an Automatic Number Identification (ANI) message in SS7 signaling.

Call center system 320 executes call center logic 324 to select an agent 344, 364 from agent database 322 to handle the call. Call center logic 324 also retrieves the telephone number of telephone 340 and the Internet address of computer 742 for the selected agent 344. Call center logic 324 then transmits the telephone number of telephone 340 to telephone system 304. Telephone system 304 processes the telephone number of telephone 340 to forward the call to telephone 340 of agent residence 318. Agent 344 answers the call.

Simultaneously, call center logic 324 transfers the Internet address of computer 742 and the telephone number of caller 302 to information control system 312. Information control system 312 communicates with caller database 332 to obtain caller information for caller 302. Information control system 312 looks up the caller information for caller 302 in caller database 332 using the telephone number for caller 302.

Information control system 312 then formats a log on message for portal 314. With conventional portals, the system or device that transmits a log on request to the portal is established as the user and the portal pushes information to the user. In this example, information control system 312 formats the log on message such that computer 342 is established as the user. Information control system 312 does this by logging on the Internet address of computer 342 as the user. Information control system 312 also formats the log on message with the caller information.

Portal 314 receives the log on message from information control system 312. Portal 314 processes the log on message and initiates a session with computer 342. Portal 314 transmits or pushes the caller information over the Internet 316 to computer 342 based on the Internet address after the session is initiated. Computer 342 displays the caller information to agent 344. After transmitting the caller information, portal 314 terminates the session with computer 342. This could happen automatically, or portal 314 may receive a log off message generated by information control system 312.

Using the caller information displayed on computer 342, agent 344 handles the call received over telephone 340. The caller information may include a name and address of caller 302, an account number of caller 302, and any relationship between caller 302 and Company 330. For instance, caller 302 may have purchased several items from Company 330 and the caller information includes a historical list of the purchased items. Then, caller 302 or agent 344 terminates the call.

Figure 4:
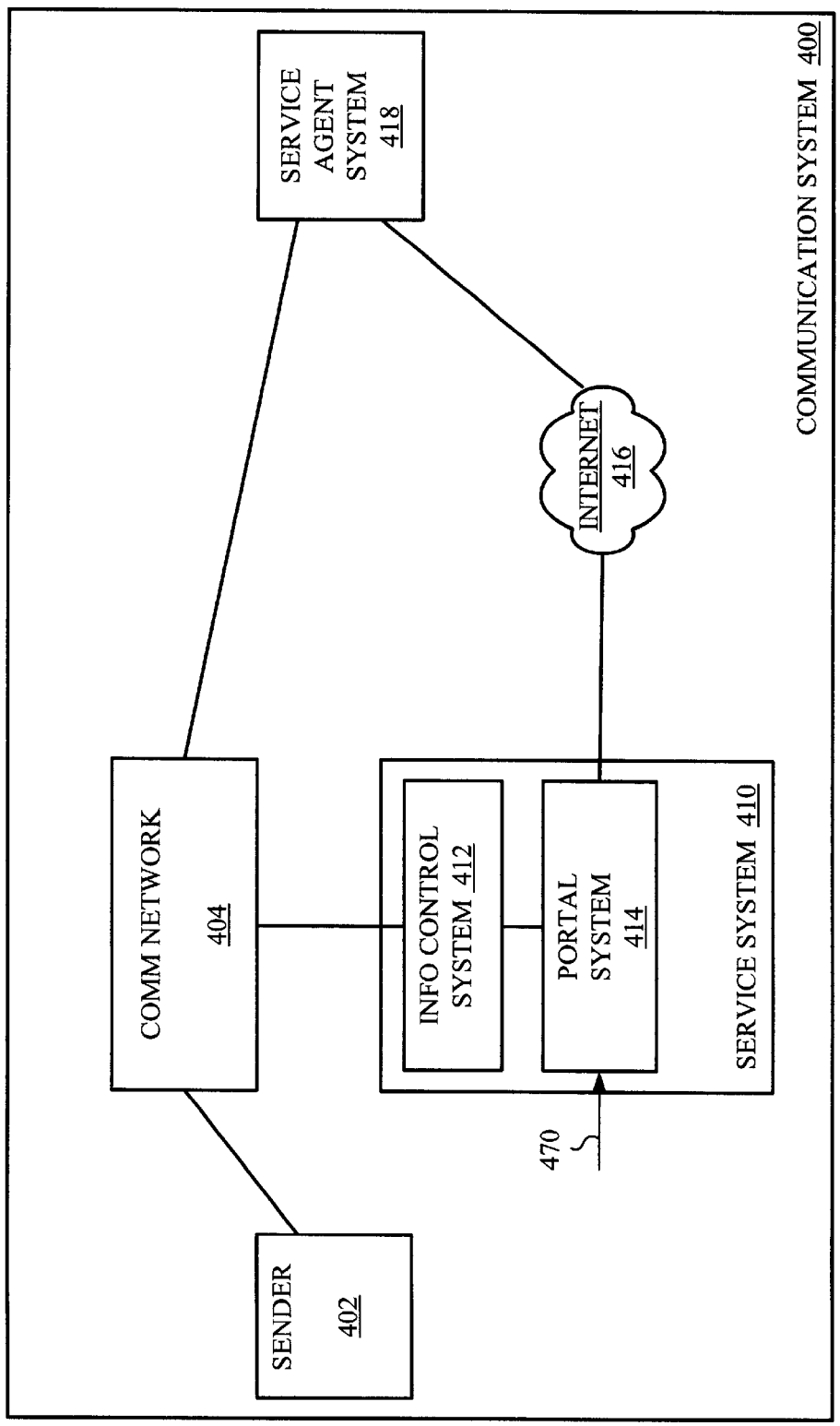
FIG. 4 is a block diagram illustrating a communication system with a service system in a further example of the invention.

Communication System with a Service System—FIG. 4

FIG. 4 is a block diagram illustrating a communication system 400 in an example of the invention. Communication system 400 is comprised of a sender 402, a communication network 404, a service system 410, the Internet 416, and a service agent system 418. Service system 410 is comprised of an information control system 412 coupled to a portal system 414. Communication network 404 is coupled to sender 402, service system 410, and service agent system 418. Portal system 414 is coupled to the Internet 416. Service agent system 418 is also coupled to the Internet 416.

A communication network comprises any network and/or system configured to route digital communications. A service system comprises any system that operates as described below. A service agent system comprises any system or device for responding to an e-mail message for a third party. The service agent system may include a computer with a modem to respond to the e-mail message. Sender information comprises any information or data associated with a sender of an e-mail message that may help a service agent system in responding to the e-mail message. Examples of sender information may include a name and address of the sender, an account number of sender, preferences of the sender, and any previous transactions of the sender. A service agent identifier comprises any information or data that indicates a service agent system. One example of a service agent identifier is an Internet address for the service agent system. A sender identifier comprises any information or data that indicates a sender. One example of a sender identifier is an Internet address for the caller.

In operation, sender 402 sends an e-mail message to a destination (not shown). The destination may be a large business, large organization, or another party that uses a service system to respond to e-mails. Communication network 404 receives the e-mail message. Communication network 404 executes service center logic (not shown) to select service agent system 418 to respond to the e-mail message. The service center logic may be included in systems other than communication network 404, such as service center system 410. Communication network 404 then routes the e-mail message to service agent system 418.

Information control system 412 receives a service agent identifier for service agent system 418 that was selected to respond to the e-mail message. Information control system 412 could receive the service agent identifier from the service center logic in communication network 404 or from another system. Information control system 412 formats a control message that includes the service agent identifier. Information control system 412 transfers the control message.

Portal system 414 receives the control message. Portal system 414 also receives sender information for sender 402, which is depicted in FIG. 4 by arrow 470. Portal system 414 transmits the sender information to service agent system 418 over the Internet 416 based on the service agent identifier. Based on this disclosure, those skilled in the art will appreciate how to modify existing service center systems to make service center system 410.

Service system 410 and service agent system 418 may be used in the following circumstance. Many web sites have a "Customer Service" page. The Customer Service page generally includes a window or icon for sending an e-mail to ask questions. Some large companies or organizations, that have this type of Customer Service page, hire service system 410 and/or service agent system 418 to respond to the e-mails received.

Portal system 414 may receive the sender information from multiple sources. For instance, in one embodiment, information control system 412 receives a sender identifier for sender 402 from communication network 404. Information control system 412 retrieves the sender information based on the sender identifier from a database (not shown). Information control system 412 may include the database or the database may be located in a remote system. Information control system 412 then includes the sender information in the control message to portal system 414.

In another embodiment, information control system 412 includes the sender identifier in the control message to the portal system 414. Portal system 414 retrieves the sender information based on the sender identifier from a database (not shown).

In either of the above embodiments, the sender identifier may comprise an Internet address of sender 402. Information control system 412 or portal system 414 would then access the database based on the Internet address to determine the caller information.

In another embodiment of the invention, portal system 414 initiates a session with service agent system 418 responsive to the control message. To initiate the session, the control message from information control system 412 comprises a log on request to log service agent system 418 on to portal system 414. Portal system 414 interprets the service agent identifier in the control message so that service agent system 418 becomes the current user. With the session set up, portal system 414 transmits the sender information to service agent system 418 over the Internet 416 based on the service agent identifier. After portal system 414 pushes the sender information to service agent system 418, service agent system 418 may not have further access to service center system 410. For instance, portal system 414 may terminate the session after transmitting the sender information. To terminate the session, portal system 414 may receive a log off request to log service agent system 418 off of portal system 414.

The systems described above may be implemented by instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

What is claimed is:

1. A call center system for use with a telephone system that transfers a call from a caller to a call agent system, the call center system comprising:

an information control system configured to receive a call agent identifier, format a message that includes the call agent identifier, and transfer the message; and a portal system configured to receive the message, receive caller information for the caller, and transmit the caller information to the call agent system over the Internet based on the call agent identifier.

2. The call center system of claim 1 wherein the portal system is further configured to:
  initiate a session with the call agent system responsive to the message;
  transmit the caller information to the call agent system over the Internet based on the call agent identifier; and
  terminate the session after transmitting the caller information.

3. The call center system of claim 1:
  wherein the message comprises a log on request to log the call agent system onto the portal system based on the call agent identifier; and
  wherein the portal system is further configured to receive a log off request to log the call agent system off of the portal system after the portal system transmits the caller information.

4. The call center system of claim 1 wherein the call agent identifier comprises an Internet address for the call agent system.

5. The call center system of claim 1,
  wherein the message further includes a caller identifier for the caller; and
  wherein the portal system is further configured to access a database based on the caller identifier to retrieve the caller information.

6. The call center system of claim 5 wherein the caller identifier comprises a telephone number of the caller.

7. The call center system of claim 1 wherein the information control system is further configured to:
  receive a caller identifier for the caller;
  access a database based on the caller identifier to retrieve the caller information; and
  format the message to include the caller information.

8. A method of operating a call center system for use with a telephone system that transfers a call from a caller to a call agent system, the method comprising:
  in an information control system,
    receiving a call agent identifier, formatting a message that includes the call agent identifier, and transferring the message; and
  in a portal system,
    receiving the message, receiving caller information for the caller, and transmitting the caller information to the call agent system over the Internet based on the call agent identifier.

9. The method of claim 8 further comprising:
  in the portal system,
    initiating a session with the call agent system responsive to the message;
    transmitting the caller information to the call agent system over the Internet based on the call agent identifier; and
    terminating the session after transmitting the caller information.

10. The method of claim 8 wherein:
  the message comprises a log on request to log on the call agent system to the portal system based on the call agent identifier; and
  in the portal system, receiving a log off request to log the call agent system off of the portal system after transmitting the caller information.

11. The method of claim 8 wherein the call agent identifier comprises an Internet address for the call agent system.

12. The method of claim 8 further comprising the steps of:
  receiving a caller identifier for the caller; and
  accessing a database based on the caller identifier to retrieve the caller information.

13. The method of claim 12 wherein the caller identifier comprises a telephone number of the caller.

14. in information control system for use with a telephone system that transfers a call from a caller to a call agent system, the information control system comprising:
  an interface system configured to receive a call agent identifier and transfer the call agent identifier; and
  a processing system configured to receive the call agent identifier and format a message that includes the call agent identifier, the message being formatted to cause a portal system to initiate a session with the call agent system and to transmit caller information over the Internet to the call agent system based on the call agent identifier utilizing the session;
  wherein the interface system is further configured to transfer the message to the portal system.

15. The information control system of claim 14 wherein the call agent identifier comprises an Internet address for the call agent system.

16. The information control system of claim 14,
  wherein the message comprises a log on request to log on the call agent system to the portal system and initiate the session with the call agent system; and
  wherein the processing system is further configured to generate a log off request for the portal system to cause the portal system to terminate the session with the call agent system after transmitting the caller information.

17. The information control system of claim 14 wherein:
  the interface system is further configured to receive a caller identifier for the caller; and
  the processing system is further configured to access a database based on the caller identifier to retrieve the caller information, and format the message to include the caller information.

18. The information control system of claim 17 wherein the caller identifier comprises a telephone number for the caller.

19. A method of operating an information control system for use with a telephone system that transfers a call from a caller to a call agent system, the method comprising:
  receiving a call agent identifier;
  formatting a message that includes the call agent identifier, the message being formatted to cause a portal system to initiate a session with the call agent system and to transmit caller information over the Internet to the call agent system based on the call agent identifier utilizing the session; and
  transferring the message to the portal system.

20. The method of claim 19 wherein the call agent identifier comprises an Internet address for the call agent system.

21. The method of claim 19,
  wherein the message comprises a log on request to log on the call agent system to the portal system and initiate the session with the call agent system; and
  further comprising the step of generating a log off request for the portal system to cause the portal system to terminate the session with the call agent system after transmitting the caller information.

22. The method of claim 19 further comprising:
  receiving a caller identifier for the caller;

accessing a database based on the caller identifier to retrieve the caller information; and formatting the message to include the caller information.

23. The method of claim 22 wherein the caller identifier comprises a telephone number for the caller.

24. A software product for use with a telephone system that transfers a call from a caller to a call agent system, the software product comprising:

call center software configured when executed by a processing system to direct the processing system to receive a call agent identifier, format a message that includes the call agent identifier, the message being formatted to cause a portal system to initiate a session with the call agent system and to transmit caller information over the Internet to the call agent system based on the call agent identifier utilizing the session, and transfer the message to the portal system; and a storage medium configured to store the call center software.

25. The software product of claim 24 wherein the call agent identifier comprises an Internet address for the call agent system.

26. The software product of claim 24, wherein the message comprises a log on request to log on the call agent system to the portal system and initiate the session with the call agent system; and wherein the call center software directs the processing system to generate a log off request for the portal system to cause the portal system to terminate the session with the call agent system after transmitting the caller information.

27. The software product of claim 24 wherein:

the call center system directs the processing system to receive a caller identifier for the caller, access a database based on the caller identifier to retrieve the caller information, and format the message to include the caller information.

28. The software product of claim 27 wherein the caller identifier comprises a telephone number for the caller.

29. A service system for use with a communication network that transfers an e-mail message from a sender to a service agent system, the service agent system for providing a response to the e-mail message, the service system comprising:

an information control system configured to receive a service agent identifier, format a control message that includes the service agent identifier, and transfer the control message; and a portal system configured to receive the control message, receive sender information for the sender of the e-mail message, and transmit the sender information to the service agent system over the Internet based on the service agent identifier.

30. The service system of claim 29 wherein the portal system is further configured to:

initiate a session with the service agent system responsive to the message;

transmit the sender information to the service agent system over the Internet based on the service agent identifier; and terminate the session after transmitting the sender information.

31. The service system of claim 29 wherein the service agent identifier comprises an Internet address for the service agent system.

32. A method of operating a service system for use with a communication network that transfers an e-mail message from a sender to a service agent system, the service agent system for providing a response to the e-mail message, the method comprising:

in an information control system,
receiving a service agent identifier, formatting a control message that includes the service agent identifier, and transferring the control message; and in a portal system,
receiving the control message, receiving sender information for the sender of the e-mail message, and transmitting the sender information to the service agent system over the Internet based on the service agent identifier.

33. The method of claim 32 further comprising:

in the portal system,
initiating a session with the service agent system responsive to the message;

transmitting the sender information to the service agent system over the Internet based on the service agent identifier; and terminating the session after transmitting the sender information.

34. The method of claim 32 wherein the service agent identifier comprises an Internet address for the service agent system.

* * * * *